UNITED STATES PATENT OFFICE.

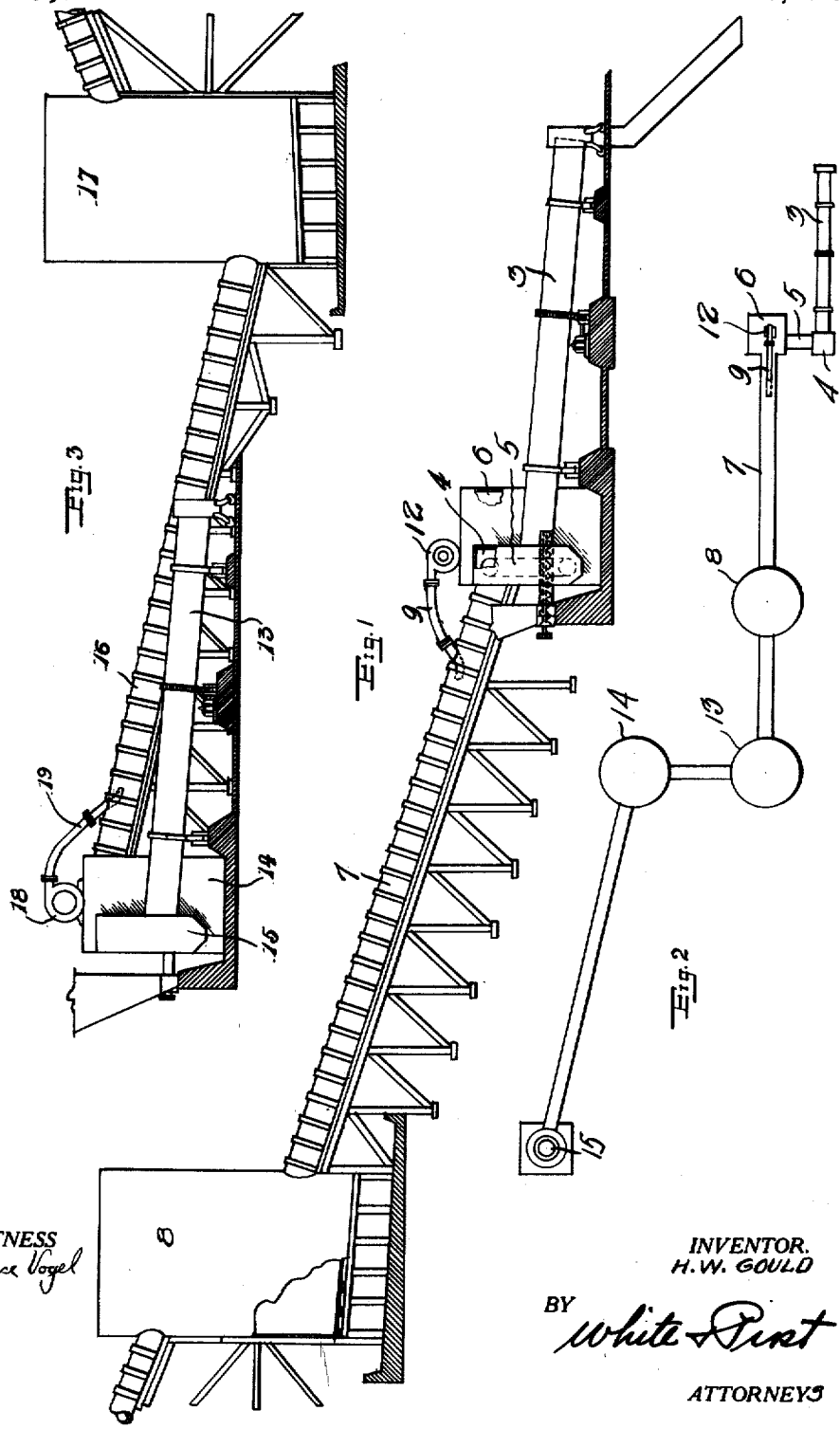

HENRY W. GOULD, OF SAN FRANCISCO, CALIFORNIA.

APPARATUS FOR RECOVERING QUICKSILVER FROM ITS ORES.

1,317,920.  Specification of Letters Patent.  Patented Oct. 7, 1919.

Original application filed December 3, 1917, Serial No. 205,059. Divided and this application filed May 22, 1918. Serial No. 235,965.

*To all whom it may concern:*

Be it known that I, HENRY W. GOULD, a citizen of the United States, and a resident of the city and county of San Francisco and State of California, have invented a certain new and useful Apparatus for Recovering Quicksilver from Its Ores, of which the following is a specification.

This application is a division of application Serial No. 205,059 filed in the United States Patent Office on December 3, 1917.

The invention relates to an apparatus for condensing the quicksilver vapor liberated from the ore and collecting the condensed metal.

An object of the invention is to provide an apparatus for condensing the quicksilver vapor into a coalescent mass.

The invention possesses other advantageous features, some of which, with the foregoing, will be set forth at length in the following description, where I shall outline in full, that form of the apparatus which I have selected for illustration in the drawings accompanying and forming part of the present specification. In said drawings I have shown two specific forms of the apparatus of my invention, but it is to be understood that I do not limit myself to such form, since the invention, as expressed in the claim, may be embodied in a plurality of forms.

Referring to said drawings:

Figure 1 is a side elevation of one form of the apparatus of my invention, part thereof being broken away to reduce the size of the figure.

Fig. 2 is a plan or top view of the apparatus shown in Fig. 1.

Fig. 3 is a side elevation of a portion of a modified form of apparatus.

Heretofore, as far as I am aware, the quicksilver vapor from the roasting furnace has been conducted to a series of large condensing chambers, usually made of brick, wherein the quicksilver condensed in relatively small particles which did not coalesce, so that further treatment of the condensed mass was necessary. Quicksilver ore usually contains sulfur, which is converted into sulfuric acid in the roasting process and this acid coats the small quicksilver particles when condensation occurs and deters the coalescence of the particles. The products of combustion from the furnace are commingled with the vapor and deposited in the condensing chambers with the quicksilver forming a sooty mass.

In accordance with the process of my invention, the quicksilver vapor, or a large proportion of it, is condensed and precipitated in a coalescent form before the condensing chamber is reached. This is accomplished by flowing the vapor, gases and other products discharged from the furnace, through a conduit and introducing a stream of air into the conduit in the direction of the stream therein. The introduction of the air causes a condensation and precipitation of the quicksilver vapor and by directing the air in the same direction as the gas stream, the furnace draft is increased and other materials, such as soot, in the gas stream, are prevented from precipitating and mixing with the condensed quicksilver. The condensed quicksilver coalesces and the conduit is preferably inclined so that the quicksilver runs from the conduit and is collected.

The quicksilver ore is roasted in any suitable furnace 3 and the products of roasting and combustion pass from the furnace into the chamber 4. From the upper part of the chamber 4 the gases and vapors pass through the downwardly-inclined conduit 5 into the bottom of the chamber 6. From the chamber 6, the gases and vapors pass into the inclined conduit 7, preferably formed of terra-cotta or tile pipe, which opens at its end into the closed tank 8. The conduit 7 is relatively long and slopes upward, as shown in Fig. 1.

Extending into the conduit 7, preferably adjacent the chamber 6, is an air pipe 9, which directs a stream of air into the conduit in the same direction as the gases flowing therein. Air under pressure is supplied to the pipe 9 by a blower 12 or other device. The air causes a condensation of the quicksilver vapor in the conduit 7, which precipitates and flows from the conduit into the chamber 6 in the construction shown in Fig. 1 and into the tank 8, in the construction shown in Fig. 3. The lighter vapors and soot, passing through the conduit 7, are carried along and prevented from precipitating by the draft through the conduit, so that the precipitating quick silver particles do not become coated or contaminated, but coalesce and the coalescent mass flows from the conduit.

The gases and vapors after passing through the conduit 7, pass in succession through a series of tanks 8, 13, 14 and thence to the stack 15, the successive tanks being preferably arranged at successively higher levels, to assist the stack in producing the required draft. Soot, sulfuric acid and quicksilver are deposited in the successive tanks, some of the quicksilver coalescing and settling to the bottom and some of it remaining in small particles in the mass of soot. The tanks are preferably provided with sloping bottoms so that the quicksilver which coalesces therein may be drawn off. The sooty mass is removed and treated to recover the quicksilver therein. The larger portion of the quicksilver, however, is precipitated in the conduit by the admission of the air stream and flows from the conduit in coalescent form.

In Fig. 3 of the drawings there is shown a modified form of my invention. In this form the products of combustion from the furnace 13 pass into the lower end of a chamber 14 through the conduit 15 and from this chamber pass into a downwardly inclined conduit 16 formed of terra cotta pipe or pipe of like material. This pipe or conduit 16 opens into a closed tank 17. A blower 18 is mounted on the chamber 14 and through a pipe 19, which discharges into the upper end of the conduit 16, forces air into said conduit. In all respects as to construction and operation this form is the same as the preferred form save that the conduit 16 is downwardly instead of upwardly inclined.

I claim:

An apparatus for recovering quicksilver from its ore, comprising a furnace in which the ore is roasted, an inclined conduit communicating with the vapor discharge end of the furnace, a chamber receiving at its lower end products of combustion from said conduit and being directly connected near its upper end with said conduit, and means for introducing a stream of air under pressure into the conduit in a direction away from the furnace.

In testimony whereof I have hereunto set my hand at San Francisco, California, this 9th day of May, 1918.

HENRY W. GOULD.

In presence of—
H. G. PROST.